US008762536B2

(12) United States Patent
Albing et al.

(10) Patent No.: US 8,762,536 B2
(45) Date of Patent: *Jun. 24, 2014

(54) COMPACT NODE ORDERED APPLICATION PLACEMENT IN A MULTIPROCESSOR COMPUTER

(75) Inventors: Carl Albing, St. Paul, MN (US); Norman Troullier, Jr., St. Paul, MN (US)

(73) Assignee: Cray Inc., Seattle, WA (US)

( * ) Notice: Subject to any disclaimer, the term of this patent is extended or adjusted under 35 U.S.C. 154(b) by 62 days.

This patent is subject to a terminal disclaimer.

(21) Appl. No.: 13/361,551

(22) Filed: Jan. 30, 2012

(65) Prior Publication Data

US 2012/0198470 A1   Aug. 2, 2012

Related U.S. Application Data

(60) Provisional application No. 61/437,918, filed on Jan. 31, 2011.

(51) Int. Cl.
*G06F 15/173* (2006.01)

(52) U.S. Cl.
USPC ............ 709/226; 709/223; 709/224; 709/225

(58) Field of Classification Search
USPC ................................................. 709/223–226
See application file for complete search history.

(56) References Cited

U.S. PATENT DOCUMENTS

| 8,161,483 B2 | 4/2012 | Barsness et al. |
| 2006/0101104 A1 | 5/2006 | Bhanot et al. |
| 2012/0059938 A1 | 3/2012 | Albing et al. |

OTHER PUBLICATIONS

Navaridas et al. "Effects of Job and Task Placement on Parallel Scientific Applications Performance", Euromicro International Conference, Feb. 2009.*
Bhuyan et al. "Generalized Hypercube and Hyperbus Structures for a Computer Network", IEEE Transactions on Computers, vol. C-33, No. 4, Apr. 1984.*
Aridor et al. "Resource Alloction and Utilazation in the Blue Gene/L Supercomputer," IBM J. Res. & Dev., vol. 49, No. 2/3, Mar./May 2005, 12 pages.
Bhuyan et al., "Generalized Hypercube and Hyperbus Structures for a Computer Network," IEEE Transactions on Computers, vol. c-33, No. 4, Apr. 1984, 11 pages.
Navaridas, J. et al., "Effects of Job and Task Placement on Parallel Scientific Application Performance, " Euromicro International Conference, Feb. 18-20 2009, 7 pages.
Non-Final Office Action for U.S. Appl. No. 13/170,654,Mail Date Feb. 1, 2013, 14 pages.
Final Office Action for U.S. Appl. No. 13/170,654, Mail Date Aug. 12, 2013, 17 pages.

* cited by examiner

*Primary Examiner* — Wing F Chan
*Assistant Examiner* — Padma Mundur
(74) *Attorney, Agent, or Firm* — Perkins Coie LLP

(57) ABSTRACT

A multiprocessor computer system comprises a plurality of nodes, wherein the nodes are ordered using a snaking dimension-ordered numbering. An application placement module is operable to place an application in nodes with preference given to nodes ordered near one another.

6 Claims, 6 Drawing Sheets

COMPACT NODE ORDERED APPLICATION PLACEMENT IN A MULTIPROCESSOR COMPUTER

CLAIM OF PRIORITY

This application claims priority to a provisional application entitled "Compact Node Ordered Application Placement for a Multiprocessor Computer" with Ser. No. 61/437,918 and filing date of Jan. 31, 2011, which is herein incorporated by reference in its entirety.

FIELD

The invention relates generally to scheduling resources in a computer system, and more specifically in one embodiment to compact node ordered application placement in a multiprocessing computer environment.

BACKGROUND

Most general purpose computer systems are built around a general-purpose processor, which is typically an integrated circuit operable to perform a wide variety of operations useful for executing a wide variety of software. The processor is able to perform a fixed set of instructions, which collectively are known as the instruction set for the processor. A typical instruction set includes a variety of types of instructions, including arithmetic, logic, and data instructions.

In more sophisticated computer systems, multiple processors are used, and one or more processors runs software that is operable to assign tasks to other processors or to split up a task so that it can be worked on by multiple processors at the same time. In such systems, the data being worked on is typically stored in memory that is either centralized, or is split up among the different processors working on a task.

Instructions from the instruction set of the computer's processor or processor that are chosen to perform a certain task from a software program that can be executed on the computer system. Typically, the software program is first written in a high-level language such as "C" that is easier for a programmer to understand than the processor's instruction set, and a program called a compiler converts the high-level language program code to processor-specific instructions.

In multiprocessor systems, the programmer or the compiler will usually look for tasks that can be performed in parallel, such as calculations where the data used to perform a first calculation are not dependent on the results of certain other calculations such that the first calculation and other calculations can be performed at the same time. The calculations performed at the same time are said to be performed in parallel, and can result in significantly faster execution of the program. Although some programs such as web browsers and word processors don't consume a high percentage of even a single processor's resources and don't have many operations that can be performed in parallel, other operations such as scientific simulation can often run hundreds or thousands of times faster in computers with thousands of parallel processing nodes available.

The program runs on multiple processors by passing messages between the processors, such as to share the results of calculations, to share data stored in memory, and to configure or report error conditions within the multiprocessor system. In more sophisticated multiprocessor systems, a large number of processors and other resources can be split up or divided to run different programs or even different operating systems, providing what are effectively several different computer systems made up from a single multiprocessor computer system.

Configuring and managing the resources used for various instances of applications and operating systems in such an environment is therefore desirable.

SUMMARY

Some embodiments of the invention include a multiprocessor computer system having a plurality of nodes, wherein the nodes are ordered using a snaking dimension-ordered numbering such that numbering traverses across a smaller dimension while snaking in at least one other dimension before traversing across a larger dimension. An application placement module is operable to place an application in nodes with preference given to nodes ordered near one another.

DETAILED DESCRIPTION

In the following detailed description of example embodiments of the invention, reference is made to specific examples by way of drawings and illustrations. These examples are described in sufficient detail to enable those skilled in the art to practice the invention, and serve to illustrate how the invention may be applied to various purposes or applications. Other embodiments of the invention exist and are within the scope of the invention, and logical, mechanical, electrical, and other changes may be made without departing from the scope or subject of the present invention. Features or limitations of various embodiments of the invention described herein, however essential to the example embodiments in which they are incorporated, do not limit the invention as a whole, and any reference to the invention, its elements, operation, and application do not limit the invention as a whole but serve only to define these example embodiments. The following detailed description does not, therefore, limit the scope of the invention, which is defined only by the appended claims.

In multiprocessor computer environments in which multiple applications, multiple operating systems, or multiple virtual machines are running, scheduling and managing computing resources well can significantly affect the usefulness and efficiency of the computer system as a whole. Many such systems will be used or configured differently by different customers, such that one customer uses an entire computer system as a single high-powered supercomputer, while another customer allows users to run separate instances of different operating systems, each executing different software on different schedules.

One example environment described below provides a computer system operator the ability to manage such a computer system using an Application Layer Placement Scheduler (ALPS), in conjunction with a batch system known as BASIL and a reservation system. ALPS is designed to work with different batch or job systems for different customers, and operates at the system service level, between applications and the operating system. The ALPS scheduler sets various resource policies, such as limiting resources available to a specific application, and in further embodiments provides other functions such as load balancing and masking architectural dependencies from the load balancing process.

Figure 1:
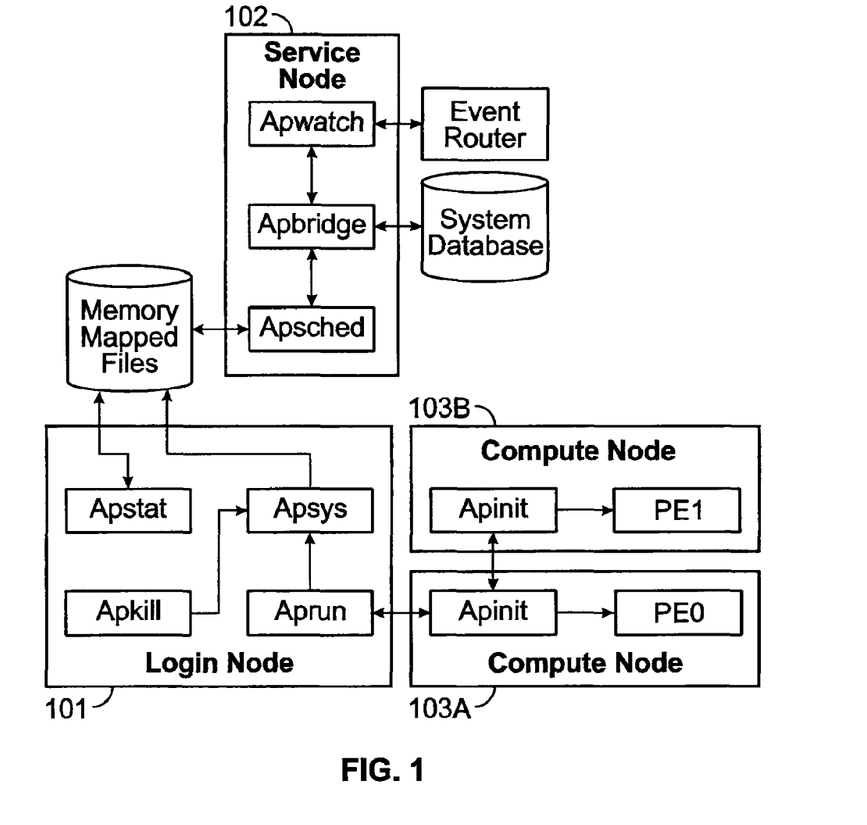
FIG. 1 shows an example application level placement scheduler block diagram, consistent with an example embodiment of the invention.

The ALPS architecture used as an example here is divided into several components, as illustrated in FIG. 1. The modular design presented here facilitates code reuse, such as among different platforms or revisions, and reduces maintenance costs. Here, a login node 101 is coupled via a processor or node interconnect network to a service node 102 and one or more compute nodes 103. In alternate embodiments, the different node processes can execute on the same node, or can each be distributed among multiple nodes.

Referring to the login node 101, the aprun client represents the primary interface between a computer user and an application being executed. To execute a program, the user specifies various command line arguments that identify the executable application code and convey resource requirements for the application. The aprun client also is responsible for managing standard input, output, and error streams, and for forwarding user environment information and other signals.

The aprun client then contacts the apsys daemon also shown as a part of the login node 101, which provides access to the application scheduler module apsched in the service node 102. The apsys daemon further communicates pending application status information to the apstat client in login node 101 via shared memory-mapped files as shown in FIG. 1. Incoming requests from ALPS client programs are processed in apsys, which maintains a connection to the aprun client.

Once aprun has contacted apsys, aprun sends the user-provided information regarding application execution to apsys, which forwards the request to the apsched daemon to obtain a resource placement that is resources the user specified as required to execute the application. If a suitable resource scheduling or allocation is not found, this process is repeated until adequate resources are found. The apsched daemon then generates a placement list and schedules a reservation, and relays the information to the aprun client.

The apsched daemon shown as part of the service node at 102 of FIG. 1 manages memory and processor resources associated with applications running on various computer nodes. Apsched in further embodiments will attempt to optimize application placement to the extent that it is able to enhance resource utilization and performance. Because different nodes may have different resources available, managing node placement is not a trivial task in many environments. Management of scarce resources such as memory management is also important to ensure efficient operation of the executing applications, and to ensure that memory is not underutilized or oversubscribed.

Once apsched has reserved a set of node resources for an application, apsched ensures the resources cannot be committed to another application. The aprun client contacts the apinit daemon running on the first compute node 103A and forks an application shepherd process to manage the process or processes that will execute on the processing node. The aprun client also transmits the placement list for the application and the executable binary application data to the shepherd process. The variety of process nodes assigned to an application form an application control tree of shepherd processes on each node that are operable to communicate with the aprun client, which is then used to initialize the program execution.

The application initialization process begins once the control tree has been established and the placement list communicated to each of the processing nodes' shepherd processes. The user's environment is recreated on each processing node, and other functions such as memory allocation are performed. Control is then passed to the executing application.

During application execution, the shepherd processes on the various nodes propagate various signals between the executing applications and the aprun client, which manages standard input and output, and standard error streams. The system also ensures that when an application exits, whether normally or due to error, the resources used by the application are surrendered back to the application level placement scheduler. After memory is released, stray processes are closed, and other such cleanup functions are completed, the aprun client executing on the login node 101 that is managing the specific application exits.

The aprun client therefore represents the primary interface between the user and an executing application. Its primary function is to submit applications to the ALPS system for placement and execution, but it also parses command line arguments, forwards the user environment to processing nodes, and manages standard I/O and error streams during program execution.

The apstat client relays status information from the ALPS system to the user, including data describing resource availability, reserved resources, and running applications. In one embodiment, apstat uses memory mapped files that the other daemons maintain to acquire data needed to generate user reports including such data. This reduces the demands on the ALPS daemons during status reporting, enabling them to more effectively service applications.

The apkill client is responsible for delivering signals to applications, normally including a signal type, application ID, and any associated command line arguments. The client contacts the local apsys daemon, which generates an apsys agent to manage a transaction. The agent locates the login node on which the aprun client for a target application resides by using the memory mapped files, and the apsys agent delivers the message if the aprun client is on the local node or contacts the apsys agent on the proper node if the application's aprun client is on another node.

The apbasil client represents the interface between ALPS and the batch system, and implements a batch and application scheduler interface layer, or BASIL. BASIL is implemented as a standard protocol, such as an XML protocol interface layer in one embodiment, acting as a bridge between ALPS and third-party batch schedulers or other resource managers.

A variety of daemons execute in the example ALPS environment presented here, including an apbridge, apwatch, apsys, apinit, and apsched daemon. The apbridge daemon provides a bridge between the architecture-independent ALPS system and the architecture-dependent configuration of the underlying multiprocessor computer system. More specifically, it queries a system database to collect data on the hardware configuration and topology, and supplies the data in a standard format to the apsched daemon for scheduling.

The apbridge daemon interfaces with the apwatch daemon, which registers with a machine-specific mechanism to receive system events and forward them in an architecture-neutral format to apbridge for further processing, where the system state events can be forwarded to apsched and used for application scheduling and resource management.

The apsys daemon provides ALPS client programs access to apsched, and delivers pending application status information to apstat by logging the data to a shared file. There is one apsys daemon per login node, and the apsys daemon forks an apsys agent child to process incoming requests from ALPS client programs. The apsys agent child retains a connection to aprun for the life of the aprun program, and is responsible for processing apkill signal requests, resource reservation messages from apbasil, and notifying apsched about resource reservations to be freed.

The apinit daemon is started on each compute node as part of the boot procedure, and receives connections from the aprun client including information needed to launch and manage a new application. The apinit master daemon constructs a control structure using this information to maintain knowledge regarding the application running on the local node, and forks an apshepherd process dedicated to managing the specific application on the local node. Apshepherd manages the connection to aprun, while the apinit master daemon continues to listen for new messages and monitors the one or more apshepherd processes on the local compute node.

Apshepherd provides standard I/O and error connectivity to the remote aprun client, and initiates the application after performing whatever architecture-specific setup functions are needed to prepare the local node environment for program execution. Apshepherd nodes also receive and forward application launch messages and other such control messages, using various radix specifications as needed to scale to a large number of nodes.

The apsched daemon manages memory and processor resources associated with particular applications running on the various compute nodes in a multiprocessor computer system running ALPS. In some further architectures, nonuniform or shared memory and interconnect state are also managed by the apsched daemon, along with other resources such as nonvolatile storage. Although apsched does not enforce policy, it is responsible for ensuring the accuracy of application placement and resource allocation, such that a resource list generated as a result of a reservation placement request includes specific resources that are assuredly reserved for the application.

The apsched daemon therefore is able to manage problems such as memory oversubscription, interactive jobs that take over resources from temporarily idling batch jobs, and other such problems that are not uncommon in multiprocessor computer systems.

Figure 2:
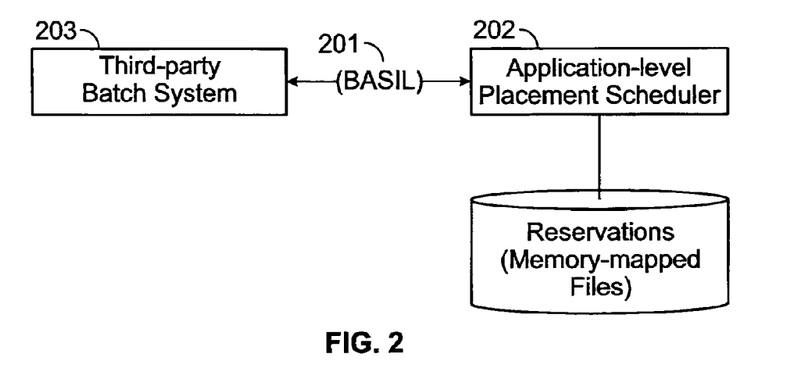
FIG. 2 shows an example multiprocessor system comprising an application level placement scheduler, a batch system, and a reservation system, consistent with an example embodiment of the invention.

The reservation and batch and application scheduler interface layer to third-party patch systems are shown in FIG. 2, and are described in greater detail below. Third-party batch systems can be used in some further examples using a Batch and Application Scheduler Interface Layer 201, or BASIL, to act as a gateway between the Application Level Placement Scheduler 202 and the batch systems 203. BASIL is implemented in one embodiment as an interface protocol that includes the primary functions of inventory, reservation creation, and reservation cancellation. When a user submits a job to a batch system, the batch scheduler determines whether sufficient resources are available to run the job by obtaining a current picture of the available and assigned resources in the computer system. BASIL provides such data through its XML-PRC interface, providing information in a format that can be easily parsed by third-party batch systems.

The batch scheduler can use the XML data obtained from BASEL to schedule one or more batch jobs for execution. Once a batch job has been scheduled, the batch system initialized the job on one or more login nodes of the multiprocessor computer system, such as node 101 of FIG. 1. During initialization, the batch system creates an ALPS reservation for the job to ensure that resources remain available through the lifetime of the executing application. Although there may be resources that are not utilized during some periods of application execution, the reservation system of ALPS prevents ALPS from creating conflicting resource assignments.

The apbasil client in the ALPS system therefore acts as an interface between various batch systems, including third-party batch systems, and the lower level system resource manager within the example system presented here. During execution of a batch job, there may be several calls to aprun to launch applications using the reserved set of resources, such that ALPS recognizes that the application launch occurs via the batch scheduler job and assigns resources reserved for the job to be used.

Upon completion of a batch job, the batch system makes a final BASIL request to cancel the reservation for the job. The reserved resources are then freed, and are available for reassignment to other jobs.

BASEL and ALPS therefore operate using a system of reservations, providing support for both batch and interactive application execution in a multiprocessor computer environment. Resource reservation ensures that batch applications are able to reserve the resources needed to schedule and execute the required jobs without interactive applications usurping resources from the batch jobs during periods when the bath application is not actively using all its needed resources. Reservations also ensure that resources that aren't being used when batch job is scheduled will still be available when a job executes, rather than simply observing what resources are being utilized and what resources are free at the time the batch job is scheduled.

The state of reservations in this example is maintained by apsys to provide a central point for reservation coordination. The BASIL interface is used to service reservation traffic from clients, such as aprun, and scheduler modules, such as apsched, to eliminate the need for proprietary reservation coding to interact with the reservation system.

The system of application level placement scheduling, batch scheduling, and reservations presented here illustrate how a multiprocessor computer system can manage the availability of resources in the multiprocessor computer system while accommodating third-party batch systems, combinations of interactive and batch jobs, and other challenges. The application level placement scheduler (ALPS) is able to manage availability of resources and to map requests to resources such as processing nodes, and is able to distribute, monitor, synchronize, applications among processing nodes and reclaim processing node resources upon application exit.

The batch and application scheduling interface layer (BASIL) provides an interface between the placement system and batch scheduling systems, including third-party batch scheduling systems, allowing the batch system to perform functions such as requesting processing node resource availability data, and providing for coordination of resource assignments between the batch system and placement scheduler, enabling management of batch jobs containing applications.

The reservation system described allows coordination of resource reservation within the placement scheduler, and between the placement scheduler and the batch system. It also guarantees that resources will be available for applications launched from batch jobs throughout their execution lifetime in environments with interactive applications being launched, and accurately conveys the state and availability of processing nodes and applications.

However, placement of jobs in nodes that are contiguous to one another is not a trivial task. Application performance can vary by 10 percent or more, depending on whether nodes are closely grouped or distributed throughout the computer system. In many typical systems, node placement is selected to achieve one or more contiguous groups of sequentially numbered nodes, assigning available nodes based on the numerical order of the nodes in the system. Nodes are typically assigned a number that is simply the next sequential number or block of available numbered nodes. However, a linear listing of nodes as is typically used does not take into account the multi-dimensional nature of complex processor interconnect networks, accounting for the distance between a node and other nodes in multi-dimensional space.

For computer systems that employ multiple chassis or cabinets, the cabinets are often interleaved physically to reduce the maximum needed cable lengths between cabinets. As traditional node ID numbering follows the physical order of nodes to make physical location of nodes straightforward, the Node ID number typically would not track the order of nodes within a network geometry, such as a torus. Large node count applications therefore would often have the nodes in which an application was placed distributed throughout the network despite being placed in sequentially numbered nodes, resulting in poor network performance.

One improvement to the sequential physical node numbering method described above involves using dimension-ordered node placement, where the nodes are numbered such that the numbers span the smaller dimensions before larger dimensions, resulting in tighter clustering of nodes in network space.

Figure 3:
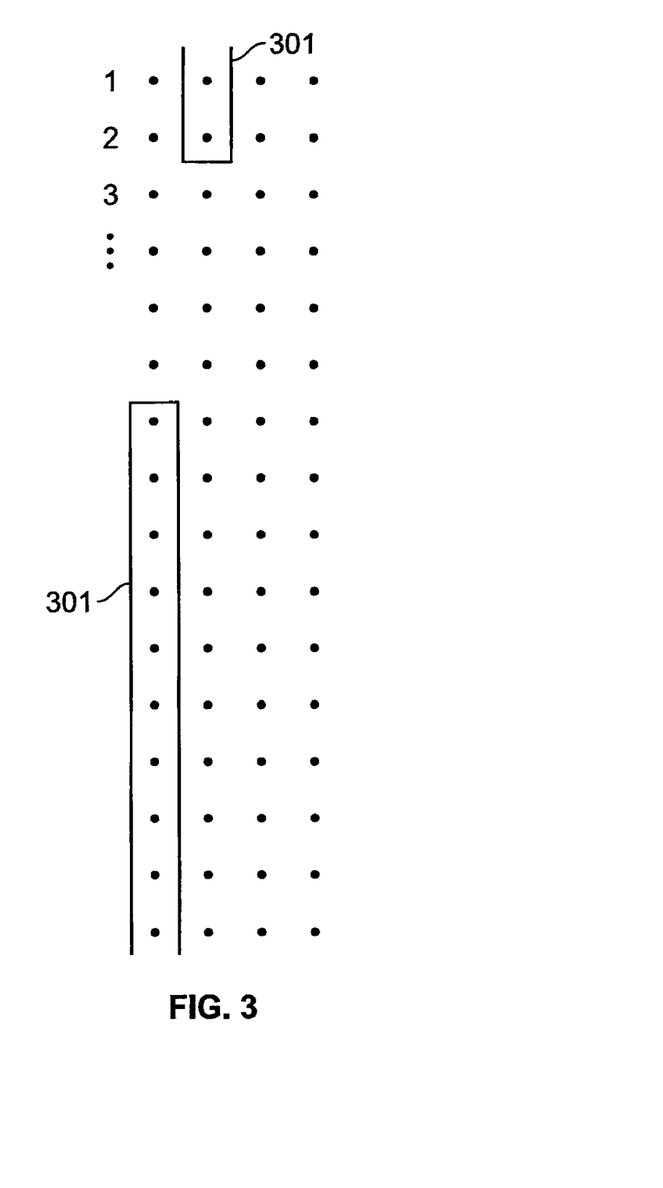
FIG. 3 shows a two-dimensional array of processing nodes, consistent with an example embodiment of the invention.

FIG. 3 shows a simplified two-dimensional array, that in a further example represents a slice of a matrix or cube of processor nodes. In a further embodiment, the processor network is an indirect network, and one or more network nodes that is not a processor node is also present. Here, a task requiring 12 processor nodes is assigned to the next sequentially available nodes, which are nodes 7-18 as shown at 301. Because the nodes are numbered in column order first, and configured in four columns of 16 nodes, placement of the application in the group of 12 free nodes starting with node 7 results in a group of 10 nodes sequentially ordered at the bottom of the first column of nodes and a group of 2 nodes at the top of the second column not local to the first group.

Each node in this example is a node in a processor interconnect network, such as a node containing one or more processors, memory, storage, or other such computing resources. These nodes are linked to one another via the processor interconnect network, enabling exchange of data between nodes such that multiple nodes can execute the same program or work on the same task, exchanging data as is necessary using the processor interconnect network.

When assigning an application to a set of nodes or making a reservation, such as by using the ALPS/BASIL/Reservations system described previously, it is desirable to assign nodes that are near to one another in the processor node interconnect topology being used, so that communication between nodes occurs faster and results in less processor interconnect network congestion. For example, in the two-dimensional processor configuration of FIG. 3, it is desired that if some nodes assigned to a program are in the lower left portion of the processor array, that other nodes assigned to work on the same program are in the same section of the processor array rather than distributed across other areas of the two-dimensional processor grid. Similarly, nodes in other configurations such as a torus will desirably be grouped with other nodes near one another in the torus, such that communication between nodes is efficient. But knowledge of the topology of a processor interconnect node is not typically employed by prior application placement, batch, or reservation systems in multiprocessor computer systems, resulting in node placement that is often inefficient.

Figure 4:
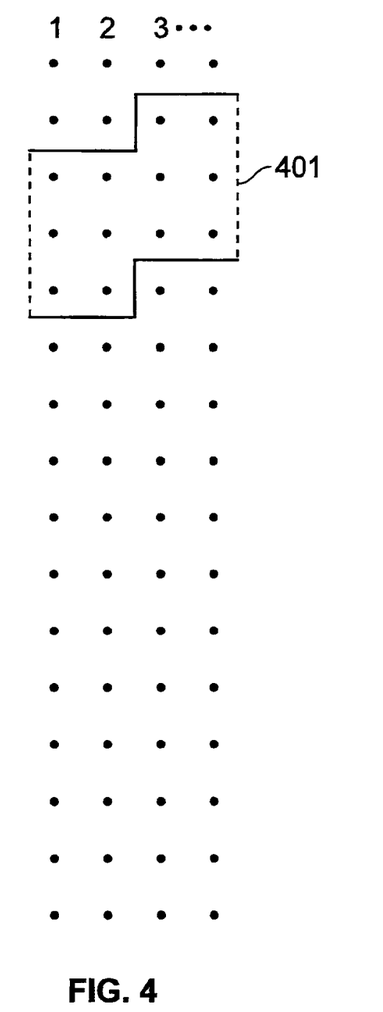
FIG. 4 shows placement of an application using dimension-ordered numbering in the two-dimensional array of processing nodes of FIG. 3, consistent with an example embodiment of the invention.

FIG. 4 shows the same simplified two-dimensional array, using dimension-ordered placement. Here, the nodes are numbered such that the numbering order traverses the smallest dimension first, such that nodes 1-4 form the first row of an array or a slice of a matrix having four columns and 16 rows. Placement of the same job used in the example of FIG. 3, which is 12 consecutive nodes starting with the first free node number 7, results in placement in nodes 7-18, just as in the example of FIG. 3. But here, nodes 7-18 form a much more closely grouped cluster, with less network distance on average between nodes in the group. This significantly speeds up network performance and reduces network congestion, and can result in up to 10% or greater speedup in program execution.

However, physical node numbering may have its own advantages in relatively small application placements, particularly where nodes numbered in physical order are clustered on the same board or in neighboring slots in a chassis. For example, an application requiring fewer than ten nodes being placed in a system with four nodes per board and eight boards per chassis would benefit from having its nodes clustered on the same or neighboring boards, all within the same chassis.

Figure 5:
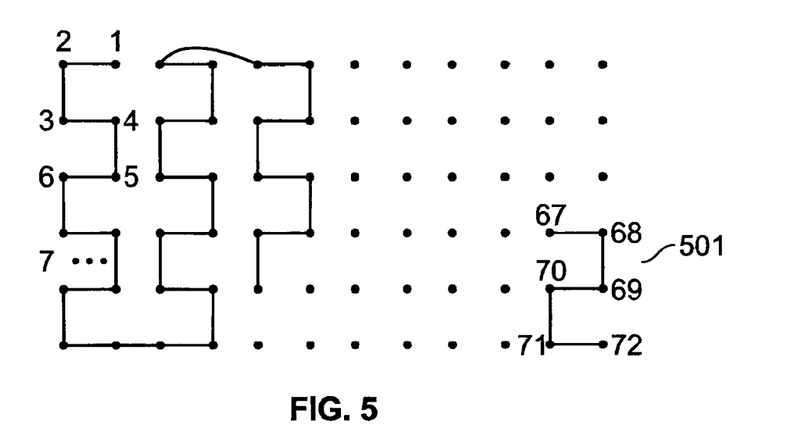
FIG. 5 shows placement of an application using snaking node numbering in a two-dimensional array of processing nodes, consistent with an example embodiment of the invention.

One example embodiment of the invention therefore seeks to combine dimension-ordered placement concepts with localized clustering of nodes in multiple dimensions, such as by using the dimension ordered-by 2 placement method illustrated in FIG. 5. Here, the benefits of localized clustering of nodes in multiple dimensions for small groups of nodes are combined with the benefits of dimension-ordered numbering, providing improved node locality for a variety of application sizes. More specifically, the node numbering again spans smaller dimensions before larger dimensions, but includes neighboring nodes in other dimensions as it does so by snaking.

FIG. 5 shows a simplified two-dimensional array of nodes, arranged in a six by twelve array. At 501, an application taking six nodes is assigned to a group of nodes that progress in the smaller dimension, across the array dimension that is six nodes rather than twelve nodes first, but spans multiple dimensions as it snakes. More specifically, simply progressing in the smallest dimension first would cause the application to be assigned to a contiguous string of six nodes, such that the end nodes assigned to the application are separated by five network hops. By snaking across neighboring nodes in two dimensions as shown at 501, the greatest distance between nodes in the group of six nodes assigned to the application is three hops.

Node ordering in this example is straightforward in that it does not require complex math to determine relative distances between nodes, but simply relies on the known dimensions of the topology being employed to number the nodes such that the small dimension is traversed before the large dimension. This concept can be extended to a variety of node network configurations having several dimensions, such as a cube where the smallest dimension is traversed first, the intermediate dimension is traversed second, and the largest dimension is traversed third while the snaking path snakes in two or three dimensions.

Figure 6:
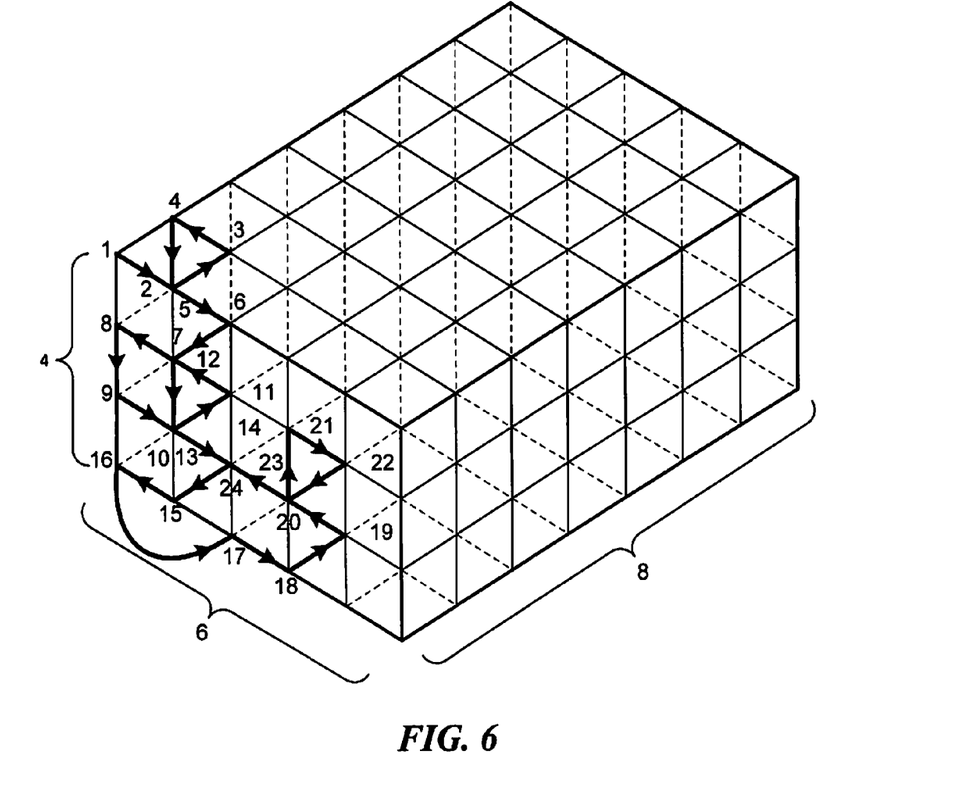
FIG. 6 shows placement of an application using snaking node numbering in a three-dimensional array of processing nodes, consistent with an example embodiment of the invention.

FIG. 6 shows a simplified three-dimensional node array, arranged in a four by six by eight array of 192 nodes. Here, the node numbering is again performed using dimension ordering, such that the numbering spans or traverses the smallest dimension of four nodes first, but snakes in three dimensions as it traverses the smallest dimension. The nodes numbered 1-4 in this example are all in the same plane, and fill a box shape before numbering proceeds to the next level in the smallest dimension. In the second, third, and fourth levels in the four-node dimension, similar box shapes are formed in two dimensions, resulting in formation of two-dimensional squares on each of the four levels. This dimension-ordered snaking method provides improved locality of small groups of nodes, such as for three nodes to low tens of nodes, while continuing to provide the locality advantages of dimension-ordered node placement.

This can also be envisioned as dimension-major ordered node placement, but using placement of 2×2×2 boxes to fill the smallest dimension first. Dimensions not divisible by two can simply be filled as a plane or a line before incrementing in the next dimension, resulting in filling the smallest dimension first using a snaking path providing higher node locality for many node placement applications than simple dimension-ordered placement alone. In alternate embodiments, filling using other shapes or node groups using dimension ordered node placement achieves a similar result, such as filling triangles, filling all neighboring nodes within one or two hops, and filling boxes that are 3×3 or a larger dimension before continuing to traverse the smallest dimension.

The example of FIG. 5 can easily be joined at the ends in two dimensions to form a torus, and the theory presented here can be adapted to any number of other node topologies not explicitly shown here. For example, the array of FIG. 6 can be joined at each end in one dimension, forming a filled washer-shaped array. Multiple compute nodes per network node may be employed, resulting in multiple individually numbered processor nodes per network node. Snaked dimension ordering of nodes is therefore similarly useful in a variety of other network configurations. In an alternate embodiment, dimension ordered numbering does not reverse direction from line to line so that nodes near the end of the line are more closely numbered to nodes near the end of the line in at least one neighboring line, but starts at the same end of the line each time.

Although the examples of FIGS. 5 and 6 illustrate application placement where using snaking dimension-ordered numbered nodes results in finding a group of contiguous nodes in which the application could be placed, it is anticipated that applications will often be split among groups of noncontiguous nodes. By employing dimension-ordering in combination with snaking to search for multiple groups of contiguous nodes, the likelihood of two such node groupings being near one another is greater than with other node numbering methods such as row-and-column.

This concept can be extended to n-dimensional cubes and other shapes having more dimensions or other topologies, such as a 4-d cube or a torus of various dimensions, as are commonly used in processor interconnect networks. More irregular node configurations, such as butterfly, dragonfly, n-fly, flattened, and other such topologies can also benefit from use of snaking dimension-ordered node numbering to assign nodes nearer one another with numbers closer to one another, resulting in more tightly clustered application placement within a multiprocessor system.

Computation of the snaking dimension-ordered numbered nodes, and ordering of the nodes using the curve, need not be repeated once a multiprocessor system is configured unless nodes are added or removed. The node numbering is typically stored as a part of the hardware configuration, such as in firmware, BIOS, an operating system, or other configuration storage. The operating system and application placement module therefore need not perform calculations related to node ordering to place an application using node ordering derived from a space-filling curve, meaning there is no performance penalty to configuring a computer system using dimension-ordered numbered nodes for application placement.

Numbering nodes using snaking dimension-ordered numbering such as in the examples described herein enables an application placement system such as that described above to allocate, reserve, and place programs in nodes that are relatively near one another by using the node numbering derived from the snaking dimension-ordered node number progression through the processor interconnect network. Reducing the mean inter-node distance results in faster communication between nodes, less congestion in the processor interconnect network, and more efficient overall operation of the multiprocessor computer system.

The following patents are hereby incorporated by reference in their entirety: U.S. Pat. Nos. 5,701,416 and 6,751,698.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the example embodiments of the invention described herein. It is intended that this invention be limited only by the claims, and the full scope of equivalents thereof.

What is claimed is:

1. A computer system for placing applications in multiprocessor computer system having nodes linked via an interconnect network, comprising:
a memory storing computer-executable instructions of:
an application placement module operable to place an application in a plurality of the nodes, by:
providing an ordering of the nodes using a snaking dimension-ordered numbering such that numbering traverses across a smaller dimension while snaking in at least one other dimension before traversing across a larger dimension wherein sequential numbers are assigned to nodes forming repeated geometric shapes in the smaller dimension, and
placing the application with preference given to nodes ordered near one another based on the provided ordering by favoring placement in sequentially numbered nodes so that the nodes tend to have a low mean distance to other nodes in which the application is placed; and
a processor for executing the computer-executable instructions stored in the memory.

2. The multiprocessor computer system of claim 1, the interconnect network comprising at least one of a n-cube of any dimension, a torus of any dimension, and an n-fly network of any dimension.

3. A method of placing applications in a multiprocessor computer system having nodes linked via an interconnect network, comprising:
ordering a plurality of nodes using a snaking dimension-ordered numbering such that numbering traverses across a smaller dimension while snaking in at least one other dimension before traversing across a larger dimension wherein sequential numbers are assigned to nodes forming repeated geometric shapes in the smaller dimension; and placing an application in a plurality of nodes via an application placement module, the application placed with preference given to nodes ordered near one another by favoring placement in sequentially numbered nodes so that the nodes tend to have a low mean distance to other nodes in which the application is placed.

4. The method of placing applications in a multiprocessor computer system of claim 3, the interconnect network comprising at least one of a n-cube of any dimension, a torus of any dimension, and an n-fly network of any dimension.

5. A machine-readable memory with instructions thereon, the instructions for placing an application on nodes linked via an interconnect network and when executed operable to cause a computerized system to:

order a plurality of the nodes using a snaking dimension-ordered numbering such that numbering traverses across a smaller dimension while snaking in at least one other dimension before traversing across a larger dimension wherein sequential numbers are assigned to nodes forming repeated geometric shapes in the smaller dimension; and place the application in a plurality of the nodes via an application placement module, the application placed with preference given to nodes ordered near one another by favoring placement in sequentially numbered nodes so that the nodes tend to have a low mean distance to other nodes in which the application is placed.

6. The machine-readable memory of claim 5, the interconnect network comprising at least one of a n-cube of any dimension, a torus of any dimension, and an n-fly network of any dimension.

* * * * *